United States Patent

Lam

[11] Patent Number: 5,901,202
[45] Date of Patent: May 4, 1999

[54] METHOD FOR INITIATING A TELEPHONE CALL ON A REMOTE LINE

[75] Inventor: Chi K. Lam, Morganville, N.J.

[73] Assignee: AT&T Corp, Middletown, N.J.

[21] Appl. No.: 08/729,104

[22] Filed: Oct. 11, 1996

[51] Int. Cl.⁶ .................................................. H04M 1/24
[52] U.S. Cl. .............................. 379/22; 379/12; 379/27; 379/93.01; 379/93.07; 375/222
[58] Field of Search .................... 379/1, 27–30, 379/12, 22, 31, 93.01, 93.03, 93.07; 375/222

[56] References Cited

U.S. PATENT DOCUMENTS

| | | | |
|---|---|---|---|
| 4,839,916 | 6/1989 | Fields et al. | 379/13 |
| 5,428,608 | 6/1995 | Freeman et al. | 375/222 |
| 5,440,585 | 8/1995 | Partridge, III | 375/222 |
| 5,521,959 | 5/1996 | Walsworth et al. | 379/29 |
| 5,528,661 | 6/1996 | Siu et al. | 379/29 |
| 5,537,436 | 7/1996 | Bottoms et al. | 375/222 |
| 5,559,792 | 9/1996 | Bottoms et al. | 375/222 |
| 5,602,846 | 2/1997 | Holmquist et al. | 379/93.07 |
| 5,636,282 | 6/1997 | Holmquist et al. | 379/93.03 |
| 5,684,825 | 11/1997 | Ko | 375/222 |

*Primary Examiner*—Curtis A. Kuntz
*Assistant Examiner*—Duc Nguyen
*Attorney, Agent, or Firm*—Robert Levy

[57] ABSTRACT

A telephone call on a remote line (190) is initiated by establishing a simultaneous voice and data connection with a slave processor (180) tied to the remote line. The slave processor is responsive to commands received on the data connection, including an off hook command signaling the slave processor to go off-hook on both the voice connection and remote line. Thereafter, the slave processor (180) bridges the voice connection and remote line. Upon receipt of the digits of a telephone number entered on the voice connection, the slave processor, in turn will dial the digits on the remote line, thereby initiating a call on that line.

10 Claims, 3 Drawing Sheets

METHOD FOR INITIATING A TELEPHONE CALL ON A REMOTE LINE

TECHNICAL FIELD

This invention relates generally to a technique for initiating a telephone call on a remote line, such as a line maintained by a foreign carrier.

BACKGROUND ART

Inter-exchange carriers, such as AT&T, provide both domestic and international telecommunications services. Invariably, the telecommunications services provided by inter-exchange carriers utilize telephone lines maintained by the inter-exchange carrier itself as well as lines maintained by other carriers. In the case of an international service, an inter-exchange carrier will utilize lines maintained by foreign carrier, such as a governmental Postal Telephone and Telegraph (PTT). To ensure high quality service, AT&T constantly tests its lines and associated equipment, making sure that each operates properly. However, the ability to test the lines of other carriers, particularly, foreign carriers, is often limited.

Testing another carrier's lines generally requires an ability to initiate a call on that line. Initiating a call on a domestic carrier's line is usually straightforward. Initiating a call on a line maintained by a foreign location carrier for testing purposes is much more difficult. Depending on the foreign location, there may be a language barrier as well as a difference in time. Sending an individual to a foreign location simply to initiate a call from a line at that location for testing purposes is not cost justified.

Thus, there is a need for a technique for remotely initiating a call from a foreign location without the need for any human intervention.

BRIEF SUMMARY OF THE INVENTION

Briefly, in accordance with the invention, a technique is provided for initiating a telephone call from a remote location. To initiate such a call, a master processor, such as a personal computer, establishes a simultaneous voice and data connection with a slave processor, also a personal computer, tied a remote telephone line. After a communications link is established between the master and the slave processors, the master processor signals the slave processor across the data channel to go off-hook on both the voice channel and on the remote line. Thereafter, the slave processor bridges the voice channel and the remote line. With the voice channel and remote lines now bridged, the master controller, (or any telephone set connected to that processor), now receives dial tone on the voice channel via the remote line, assuming that the line is functioning properly. Upon receipt of dial tone on the voice channel, the master processor (or a human operator using the telephone set connected to the master processor) enters a set of digits, corresponding to a preselected destination number to initiate a call on the remote line.

DETAILED DESCRIPTION

Figure 1:
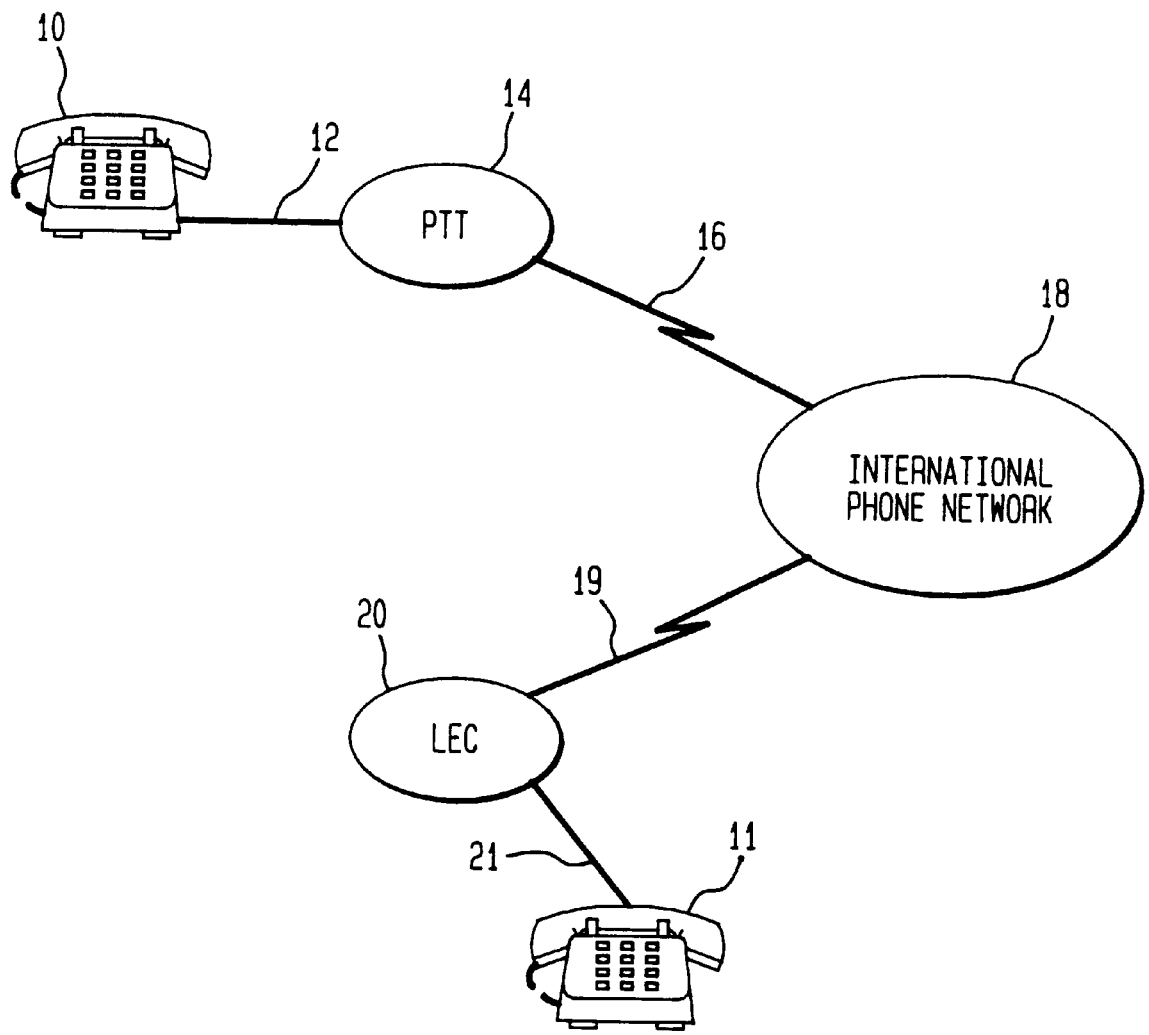
FIG. 1 is a simplified block diagram of a conventional international telephone network.

FIG. 1 depicts a the manner in which a telephone subscriber in a foreign country (represented by the telephone set 10), completes a telephone call to a telephone subscriber (represented by the telephone set 11) within another country, say the United States in accordance with the prior art. Initially, the foreign subscriber 10 goes off-hook. Thereafter, the foreign subscriber 10 enters the telephone number, including the country code, the area code, the exchange and the line number, of the U.S. subscriber 11. The dialed digits pass from the foreign subscriber's telephone 10 via a line 12 to a central office 14 in the foreign country that is typically maintained by the country's Post Telegraph and Telephone (PTT) or such other domestic telecommunications carrier.

Upon receipt of the dialed digits, the PTT central office 14, recognizing that the initiated call is directed to the United States (or another country), then seizes a trunk 16 to an international telephone network 18, such as the type maintained by AT&T. The international network 18, in turn, seizes a trunk 19 to a local exchange carrier 20 connected via a line 21 serving the dialed subscriber 11. The local exchange carrier 20 then rings the subscriber 11, and if subscriber answers, the call is completed.

To ensure high quality service, the carrier that maintains the international phone network 18 typically conducts test its network, as well as tests of the trunks 16 and 19. Testing of the lines 12 and 21 by the carrier that maintains the international telephone network 18 is usually problematic. This is particularly true if the international phone network 18 is based predominantly in the United States, while the line 12 exists within the foreign country. Coordinating the testing of telephone lines within a foreign country has proven difficult, especially because of differences in time zones, and possible differences in language.

Figure 2:
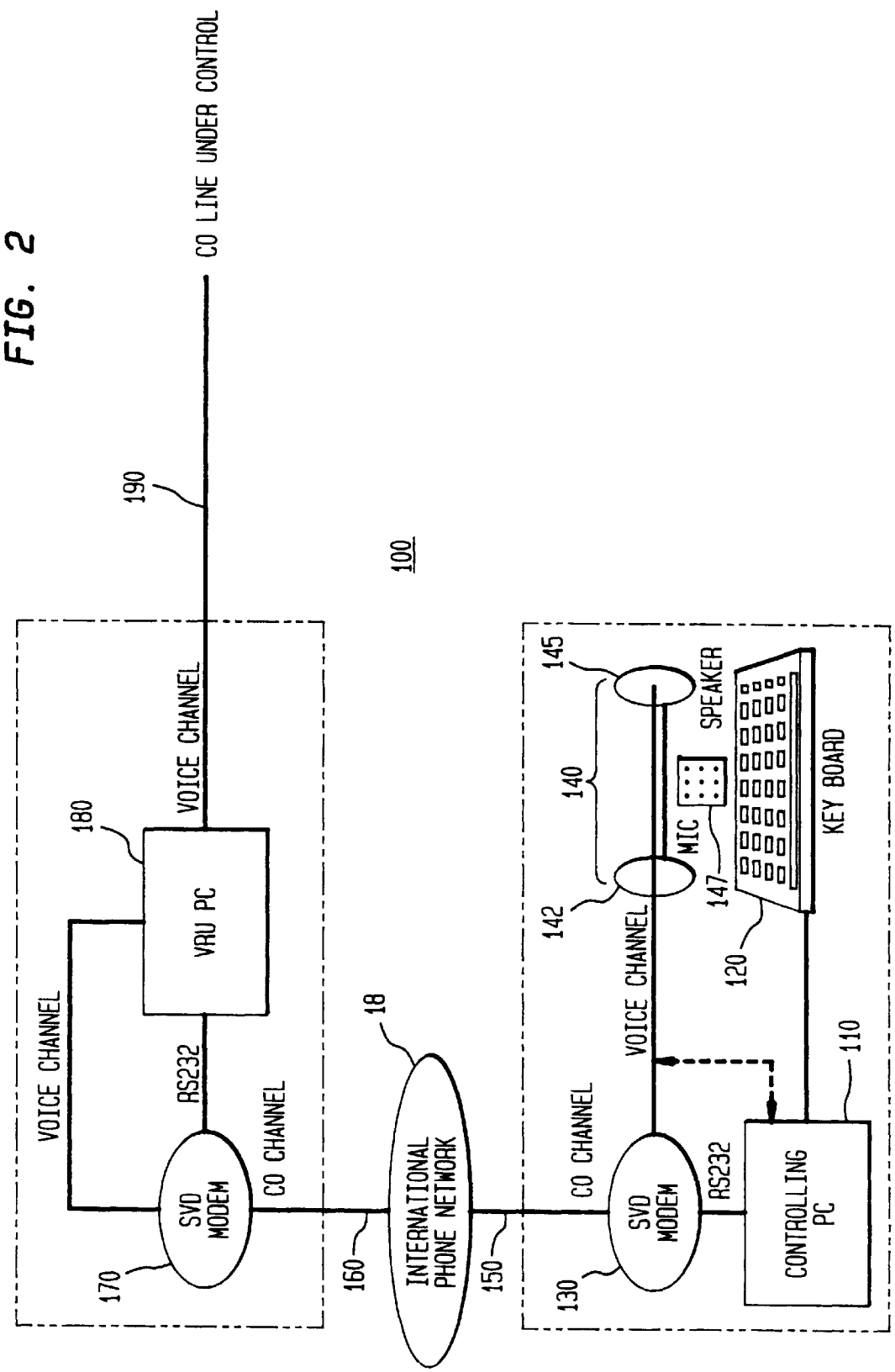
FIG. 2 is a block schematic diagram of system, in accordance with the invention, for initiating a call on a remote line of the network of FIG. 1.

FIG. 2 depicts a system 100, in accordance with the invention, for initiating a telephone call on a remote line for the purpose of testing the line 12. The system 100 includes a master (controlling) processor 110, typically a personal computer of the type well known in the art. Although not shown, the processor 110 typically includes a storage device, such as a disk drive, that contains a stored program that directs the operation of the processor. Associated with the processor 10 is a keyboard 120 through which commands may be entered to the processor to initiate execution of the stored program, as well as to make modifications thereto. Typically, the processor 110 is also coupled to a display device in the form of a monitor (not shown).

The processor 110 is connected to via a data channel (typically an RS-232 line) to a Simultaneous Voice and Data (SVD) modem 130. The SVD modem 130 simultaneously transmits data to and from the processor 110 across the data channel while transmitting voice across a voice channel to and from a voice device 140, such as a telephone set, having a microphone 142, a receiver 145 and a key pad 147 for entering DTMF signals. The SVD modem 130 is available from several sources, including AT&T Paradyne, Key Largo, Fla.

The SVD modem 130 is connected via a communications line 150 to the international telephone network 18. In practice, the modem 130, together with the processor 110, the keyboard 120, the telephone set 140, as well as the display device (not shown) may be co-located in the international network 18 at a domestic location, as indicated by the dashed line enclosing the processor, keyboard and telephone set. However, it is not necessary for these elements to co-located with the international network 18.

A second communication line 160, similar in nature to the line 150, connects the international network 18 to a second SVD modem 170 that has its voice and data channels coupled to a Voice Response Unit (VRU) 180. The VRU 180 typically takes the form of a personal computer or the like, that is also coupled to a remote telephone line 190. In practice, the VRU 180 and the SVD modem 170 are typically situated at, or in proximity to, the PTT 14 of FIG. 1 as represented by the dashed lines around these elements.

Figure 3:
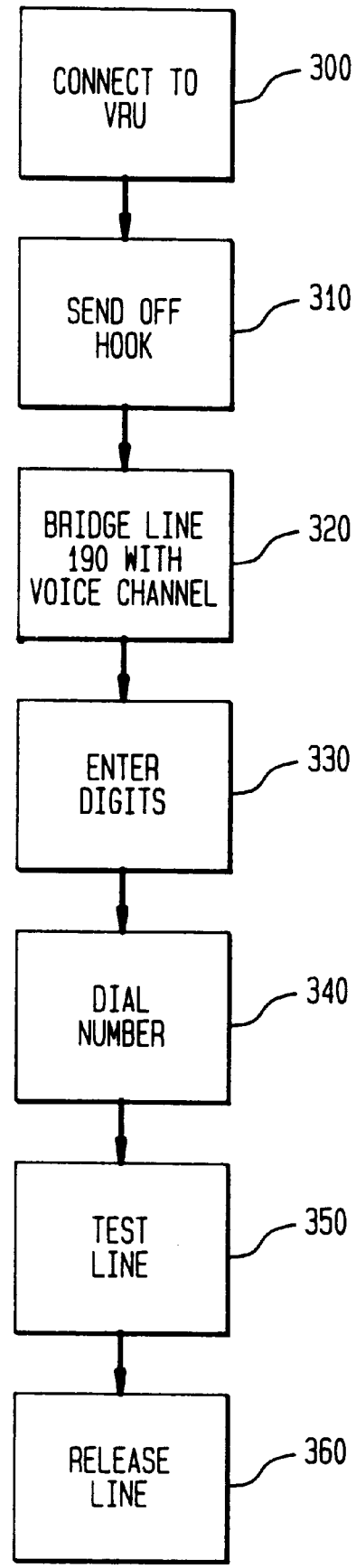
FIG. 3 is a flow chart diagram depicting the steps executed by the system of FIG. 2 to initiate a telephone call on a remote line.

FIG. 3 illustrates the steps executed by a control program within the master processor 110 of FIG. 2 to initiate a phone call on the remote line 190 of FIG. 2 to enable testing of the line 12. At the outset, step 300 is executed during which the master processor 110 establishes a connection with the VRU 180 across the international network 18. To accomplish such a connection, the master processor 110 enters an address, typically in the form of a telephone number or the like, of the SVD modem 170 to the international network 18 across the line 150. In response, the international network 18 establishes a link with the SVD modem 170 across the line 160. After appropriate handshaking, a connection is completed between the SVD modems 130 and 170, and hence, between the master processor 110 and the VRU 180.

Following step 300 of FIG. 3, step 310 is executed, whereupon the master processor 110 sends an "off-hook" command across the data line to the SVD modem 130 for transmission across the data channel on the lines 150 and 160 to the SVD modem 170. The SVD modem 170 passes the "off-hook" command to the VRU 180 which, in turn, goes off hook on the line 190 in exactly the same way that a conventional telephone set (not shown) goes off-hook. About the same time, the VRU 180 goes off-hook with respect to the voice channel of the SVD modem 170.

Step 320 of FIG. 3 is executed following step 310, whereupon the VRU 180 bridges the line 190 with the voice channel of the SVD modem 170. Once the VRU 180 bridges the line 190 with the voice channel of the SVD modem 170, the line 190 now becomes connected to the SVD modem 130 through line 160, the international network 18 and the line 150. After the line 190 is bridged with the voice channel of the SVD modem 130, that modem signal the telephone set 140 of such a connection by supplying a ringing tone for receipt by the receiver 145. When the human operator answers the voice device following the signal from the SVD modem 130, the human operator will hear a dial tone on the receiver 145 corresponding to the dial tone present on the line 190.

Step 330 is executed next, whereupon, then the digits of a destination telephone number, such as the number associated with the line 12, are entered to the SVD modem 130. In the illustrated embodiment, the human operator enters the digits modem as DTMF signals via the keypad 147 of the telephone set 140. Alternatively, the voice channel of the SVD modem 130 could be connected to the master processor 110 (as indicated by the dashed lines), rather than to the telephone set 140, thereby allowing the master processor to automatically dial the remote telephone destination number.

The digits of the remote destination telephone number entered to the SVD modem 130 pass via the line 150, the international network 18 and then to the line 160 for passage to the SVD modem 170 and ultimate receipt by the VRU 180. Upon their receipt, the VRU 180 dials the digits of the remote number (step 340). Assuming that the remote destination telephone number corresponds to the number associated with the line 12 of FIG. 1, then by dialing the digits, the VRU 180 effectively seizes the line 12 for testing purposes. Once the line 12 is seized, the line is tested (step 350). For example, a human operator may test the line simply by conducting a conversation with a subscriber via subscriber's telephone set 10 (see FIG. 1) once the subscriber has answered the call. Alternatively, in the event that the master processor 110 were connected both to the voice and the data channels of the SVD modem 130 as discussed, then the master processor could conduct such testing automatically, by measuring selected parameters. Following testing, the master processor 110 releases the line (step 360) by signaling the VRU 180, via the data channel of the SVD modems 130 and 170, to go on-hook on line 190.

The foregoing describes a technique for initiating a telephone call on a remote line.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for initiating a telephone call across a remote line to a remote telephone set, comprising the steps of:
   establishing simultaneous voice and data connections with a slave processor coupled to the remote line;
   signaling the slave processor across the data connection to go off-hook on both the voice connection and on the remote line, thereby seizing the remote line;
   bridging the remote line and the voice connection; and
   entering the digits of a remote telephone number identifying the remote line associated with the remote telephone set via the voice connection to the slave processor to complete a call to the remote telephone set across the remote line.

2. The method according to claim 1 wherein the simultaneous voice and data connection is established over a telecommunications line with the slave processor through a simultaneous voice and data modem.

3. The method according to claim 1 wherein the digits entered manually by a human operator via a telephone set.

4. The method according to claim 1 wherein the digits are entered automatically via a master controller that is in simultaneous voice and data communication with the slave processor.

5. A method for initiating a telephone call across a remote line to a remote telephone set, comprising the steps of:
   establishing simultaneous voice and data connections with a slave processor coupled to the remote line;
   signaling the slave processor across the data connection to go off-hook on the voice connection and on the remote line;
   bridging the remote line and the voice connection; and
   entering the digits of a remote telephone number identifying the remote line associated with the remote telephone set via the voice connection to the slave processor to complete a call to the remote set across the remote line, thereby seizing the remote line associated with the remote telephone set for testing purposes;

testing the remote line; and releasing the remote line identified by the remote telephone number upon completion of testing.

6. The method according to claim 5 wherein the simultaneous voice and data connection is established over a telecommunications line with the slave processor through a simultaneous voice and data modem.

7. The method according to claim 5 wherein the digits entered manually by a human operator via a telephone set.

8. The method according to claim 5 wherein the digits are entered automatically via a master controller that is in simultaneous voice and data communication with the slave processor.

9. The method according to claim 5 wherein the telephone line associated with the remote number is tested manually by conducting a voice conversation across the line.

10. The method according to claim 5 wherein the remote line associated with the remote number is tested automatically via a master processor that measures parameters associated with said line.

* * * * *